United States Patent
Okazaki et al.

(10) Patent No.: US 6,319,587 B1
(45) Date of Patent: Nov. 20, 2001

(54) BIAXIALLY-ORIENTED POLYESTER FILM

(75) Inventors: Iwao Okazaki, Kyoto; Shozi Nakajima; Yukari Nakamori, both of Shiga, all of (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 09/373,258

(22) Filed: Aug. 12, 1999

(30) Foreign Application Priority Data

Sep. 24, 1998 (JP) .................................................. 10-269612
Sep. 25, 1998 (JP) .................................................. 10-271086

(51) Int. Cl.$^7$ .......................... B32B 27/18; B32B 27/36; B32B 31/16
(52) U.S. Cl. .......................... 428/141; 428/213; 428/215; 428/216; 428/323; 428/480; 428/694 SG; 428/910; 264/288.4; 264/290.2
(58) Field of Search .................................. 428/480, 910, 428/141, 323, 213, 215, 216, 694 SG; 264/290.2, 288.4

(56) References Cited

U.S. PATENT DOCUMENTS 4,489,124 * 12/1984 Watanabe .............................. 428/220
5,631,124 * 5/1997 Ikuhara et al. ....................... 430/533
5,968,666 * 10/1999 Carter et al. .......................... 428/480

* cited by examiner

*Primary Examiner*—Vivian Chen
(74) *Attorney, Agent, or Firm*—Schnader Harrison Segal & Lewis LLP

(57) ABSTRACT

A biaxially-oriented polyester film includes at least two layers and at least one outermost layer is composed of a polyester having a rigid amorphous content of about 10 to 55%. The biaxially-oriented polyester film has a longitudinal Young's modulus of at least about 4.5 GPa. The biaxially-oriented polyester film is suitable for high-density magnetic recording media, such as digital video tapes and high-density data recording tapes.

36 Claims, No Drawings

BIAXIALLY-ORIENTED POLYESTER FILM

BACKGROUND OF THE INVENTION

1. Field of the Invention

The present invention relates to biaxially-oriented polyester films.

2. Description of the Related Art

Among known biaxially-oriented polyester films are biaxially-oriented laminated polyester films disclosed in, for example, Japanese Patent Application Laid-Open No. 2-77431. When conventional biaxially-oriented polyester films are used as magnetic recording media, they have improved output and traveling performance. High-density magnetic recording such as digital video recording, however, requires further increased output and higher reliability of magnetic recording media.

SUMMARY OF THE INVENTION

It is an object of the present invention to provide a biaxially-oriented polyester film having high output characteristics suitable for digital video recorders and high-density data recording.

A biaxially-oriented polyester film in accordance with the present invention includes at least two layers, at least one outermost layer comprising a polyester having a rigid amorphous content of about 10 to 55%, and the biaxally-oriented polyester film has a longitudinal Young's modulus of at least about 4.5 GPa.

DESCRIPTION OF THE PREFERRED EMBODIMENTS

The biaxially-oriented polyester film in accordance with the present invention has a multilayer configuration including at least two layers. The multilayer configuration is essential for satisfying the requirements for high-quality digital video recording and high density data recording. Single-layer films do not satisfy such requirements due to difficulty in optimization of the surface characteristics thereof, because the formation of the optimized surface in the single-layer configuration is not practical due to production costs. In the present invention, the multilayer configuration includes at least two layers. For example, the multilayer configuration may include three layers, e.g., A/B/A and A/B/C, and more layers.

At least one outermost layer (hereinafter referred to as the "A layer") as a constituent of the biaxially-oriented polyester film in accordance with the present invention is preferably composed of polyethylene terephthalate (hereinafter referred to as PET) or polyethylene 2,6-naphthalenedicarboxylate (hereinafter referred to as PEN) in view of output characteristics. The A layer may contain any other polymer or may be composed of a copolymer thereof within the scope satisfying the advantages of the present invention. In addition, the A layer may contain proper amounts of additives, such as antioxidants, thermal stabilizers, and UV absorbents within the scope necessary for the advantages of the present invention.

Other layers as constituents of the biaxially-oriented polyester film in accordance with the present invention are preferably composed of polyesters. Examples of preferable polyesters include PET, polypropylene terephthalate (hereinafter referred to as PPT), PEN, and polypropylene 2,6-naphthalenedicarboxylate (hereinafter referred to as PPN). Among polyesters having propylene repeating units, 1,3-propylene glycol is preferably used as a monomer in view of output characteristics. The other layers may contain any other polymer or may be composed of a copolymer thereof within the scope necessary for the advantages of the present invention. In addition, the other layers may contain proper amounts of additives, such as antioxidants, thermal stabilizers, and UV absorbents within the scope necessary for the advantages of the present invention.

A crystalline polymer includes a crystalline phase and an amorphous phase. The amorphous phase is partially unfrozen above the glass transition temperature. The unfrozen phase is called a "mobile amorphous phase", whereas the frozen phase is called a "rigid amorphous phase". The rigid amorphous content is defined as the residual content when the crystalline content or crystallinity (%) and the mobile amorphous content are subtracted from the total 100%.

In the present invention, the polyester constituting the A layer has a rigid amorphous content of about 10 to 55% and preferably about 15 to 45%. The rigid amorphous phase having such a content contributes to increased film strength and improved size stability, resulting in improved output characteristics.

The biaxially-oriented polyester film in accordance with the present invention has a longitudinal Young's modulus of at least about 4.5 GPa and preferably about 5 to 10 GPa. Output characteristics are significantly improved by increasing the longitudinal Young's modulus.

When the A layer is primarily composed of PET, the glass transition temperature (Tg) of the A layer is in a range of preferably about 95 to 125° C. and more preferably about 100 to 120° C. In this case, the rigid amorphous content of the A layer is in a range of about 10 to 45% and more preferably about 15 to 45%.

When the A layer is primarily composed of PEN, the glass transition temperature of the A layer is in a range of preferably about 120 to 155° C. and more preferably about 125 to 150° C. in view of output characteristics. In this case, the rigid amorphous content of the A layer is preferably in a range of about 15 to 45%.

The outermost layers of the biaxially-oriented polyester film have a crystallinity in a range of preferably about 25 to 50% and more preferably about 30 to 45%, in view of output characteristics and abrasion resistance.

When the A layer is primarily composed of PET, it is preferable in view of output characteristics that the biaxially-oriented polyester film of the present invention satisfy the relationship of approximately $Y_1 \leq 0.05X$, wherein $Y_1$ is the thermal shrinkage (%) in the longitudinal direction at 80° C. after 30 minutes and X is the longitudinal Young's modulus (GPa).

When the A layer is primarily composed of PEN, it is preferable in view of output characteristics that the biaxially-oriented polyester film of the present invention satisfy the relationship of approximately $Y_2 \leq 0.05X$, wherein $Y_2$ is the thermal shrinkage (%) in the longitudinal direction at 100° C. after 30 minutes.

The A layer preferably contains inorganic or organic inert particles to improve output characteristics. The particle content is in a range of preferably about 0.05 to 3.0 percent by weight and more preferably about 0.1 to 2 percent by weight. The number of the surface projections on the A layer is controlled to be in a range of preferably about 3,000/mm² to 15,000,000/mm² and more preferably about 5,000/mm² to 12,000,0001/mm², in order to maintain high levels of output characteristics. The average size of the particles is in a range of generally about 0.01 to 1.5 μ and preferably about 0.02 to 1.0 μ. The relative standard deviation of the particle sizes is in a range of preferably about 0.5 or less, more preferably about 0.3 or less, and most preferably about 0.2 or less. Any type of particles may be used without restriction in the present invention. Examples of preferable particles include aluminum silicate, calcium carbonate, alumina, silica, calcium phosphate, titanium oxide, and organic particles. Different types of particles may be used in combination.

In the biaxially-oriented polyester film of the present invention, layers other than the outermost layers also may contain particles. In this case, the average size of the particles is in a range of generally about 0.05 to 1.0 $\mu$ and preferably about 0.1 to 0.8 $\mu$. The relative standard deviation of the particle sizes of said film is in a range of preferably about 0.5 or less, more preferably about 0.3 or less, and most preferably about 0.2 or less. The particle content of said film is in a range of preferably about 0.05 to 3.0 percent by weight, more preferably about 0.02 to 2 percent by weight, and most preferably about 0.05 to 1 percent by weight. Any type of particle may be used without restriction in the present invention. Examples of preferable particles in view of output characteristics include aluminum silicate, calcium carbonate, alumina, silica, calcium phosphate, titanium oxide, and organic particles. Different types of particles may be used in combination.

Although the thickness of the A layer is not limited, it is preferably in a range of about 0.01 to 3.0 $\mu$m, more preferably about 0.02 to 2.0 $\mu$m, and most preferably about 0.03 to 1.0 $\mu$m, in view of output characteristics.

The biaxially-oriented polyester film of the present invention preferably satisfies substantially the relationship $0.2d \leq t \leq 10d$, more preferably $0.3d \leq t \leq 5d$, and most preferably $0.5d \leq t \leq 3d$, between the thickness (t) of the A layer and the average particle diameter (d) of the particles in the A layer, in view of output characteristics.

The biaxially-oriented polyester film in accordance with the present invention is suitably used in magnetic recording, packaging, cards such as prepaid cards, and more preferably used in data recording tapes requiring high output, such as digital video tapes and computer data tapes.

Preferable methods for producing the biaxially-oriented polyester film of the present invention will be described. The polyester for forming the polyester film may be produced by any known method. For example, PET is produced by ester-exchange and polycondensation of terephthalic acid or dimethyl terephthalate and diethylene glycol.

Preferable methods for compounding particles in the polyester include use of particle slurry as a diol component for polymerization of the polyester and kneading aqueous slurry of particles into a polymerized polyester using a vented biaxial kneader-extruder. A method for effectively controlling the particle content is preparation of a high-concentration master batch by the above process and dilution of the master batch with a polymer which does not substantially contain particles in the filming process.

The resulting polyester pellets are dried, fed into a melt extruder, and extruded through a slit die to form a melted sheet. The melted sheet is cooled and solidified on a casting roll to form an unoriented film. Herein, a plurality of melted polyester sheets are laminated using a plurality of extruders, a plurality of manifolds or a converging block.

The unoriented film is biaxially oriented by biaxial stretching. Stretching may be performed by consecutive biaxial stretching or simultaneous biaxial stretching. In the consecutive biaxial stretching, the stretching in the longitudinal direction is preferably performed by three or more stages at a temperature of about 70 to 160° C., a longitudinal draw ratio of about 3 to 8, and a longitudinal stretching rate of about 5,000 to 50,000%/min. A preferable longitudinal stretching includes first stage of stretching at a draw ratio of about 1 to 3 at about 70 to 100° C., second stage of stretching at a draw ratio of about 1 to 3 at a higher temperature than the stretching temperature of the first stage, and third stage of stretching at a draw ratio of about 1 to 3 at a higher temperature than the stretching temperature of the second stage. Another preferable longitudinal stretching includes first stage of stretching at a draw ratio of about 1 to 2 at about 110 to 160° C., second stage of stretching at a draw ratio of about 1 to 3 at a lower temperature than the stretching temperature of the first stage, and third stage of stretching at a draw ratio of about 1 to 3 at a lower temperature than the stretching temperature of the second stage. The stretching in the transverse or width direction is preferably performed using a tenter at a temperature of about 80 to 150° C., a transverse draw ratio of about 3 to 8, and a transverse stretching rate of about 1,000 to 20,000%/min. The longitudinal stretching and the transverse stretching may be repeated, if necessary. In such a case, the longitudinal stretching is preferably performed at a temperature of about 90 to 170° C. and a longitudinal draw ratio of about 1.1 to 2.0 and the transverse stretching is preferably performed using a tenter at a temperature of about 90 to 180° C. and a longitudinal draw ratio of about 1.1 to 2.0.

Among the stretching conditions, the draw ratios and stretching temperatures significantly affect molecular orientation, and thus the glass transition temperature and the rigid amorphous content. Thus, these conditions are preferably optimized to prepare the biaxially-oriented polyester film of the present invention. For example, low-temperature stretching and/or a high draw ratio cause high orientation and thus increased glass transition temperature.

Next, the biaxially oriented film is heat-treated. The heat-treating temperature is in a range of preferably about 180 to 240° C. and more preferably about 180 to 230° C. and the heat-treating time is preferably in a range of about 2 to 60 seconds. Since the glass transition temperature and the rigid amorphous content depend on the annealing conditions and the conditions for cooling to ordinary temperature after the annealing, these conditions are preferably optimized when the biaxially-oriented polyester film of the present invention is produced. For example, the conditions for cooling to ordinary temperature include three or more stages at about 180 to 50° C. for gradually cooling the film under unrelaxed conditions. In this cooling process, a tension of 1 MPa or more in the longitudinal direction is effective for compatibility between the rigid amorphous content and the Young's modulus. The longer the annealing time, the higher the glass transition temperature. Since a higher process speed causes a decreased rigid amorphous content, a decreased process speed is effective for an increased rigid amorphous content.

Another effective method for controlling the rigid amorphous content within the scope of the present invention is to anneal a rolled film after biaxial orientation at a temperature of not less than about 60° C. but less than the glass transition temperature at a humidity of not more than about 80% RH for about 24 to 240 hours.

Methods for Measuring Physical Properties and Various Characteristics

Methods for measuring physical properties and various characteristics in the present invention will now be described.

(1) Average Particle Diameter

The polyester component is removed from the film by plasma ashing treatment to expose particles, under conditions capable of ashing the polymer but not damaging particles. The particles are observed using a scanning electron microscope (SEM) and particle images are analyzed by an image analyzer. The SEM magnification is in a range of approximately 2,000 to 10,000 and one side in a visual field of approximately 10 to 50 $\mu$m. At least 5,000 particles are observed in different visual fields and the volume average diameter d of the particles is determined by the particle sizes and the volume fractions thereof.

When the particles are, for example, organic particles which will be significantly damaged by the plasma ashing treatment, the following process may be employed.

A cross-section of the film is observed using a transmission electron microscope (TEM) at a magnification of 3,000 to 100,000. Using a TEM specimen having a thickness of approximately 100 nm, at least 500 visual fields are observed and the volume average diameter d of the particles are determined as above.

(2) Particle Content

The particle content is determined by the ratio of the height of a peak due to the carbonyl group of the polyester and the height of a peak due to the particle by microscopic Fourier transform infrared (FT-IR) spectrometry. The ratio of the peak heights is converted to the ratio by weight using a calibration curve which is obtained from samples having known ratios by weight. An X-ray microanalyzer may be used, if necessary. If a solvent capable of dissolving the polyester and not capable of dissolving the particles can be selected, the polyester is dissolved using the solvent and the particles are separated from the polyester by a centrifugal process and weighed to directly determine the particle content (percent by weight).

The particle content in the surface portion of the film is determined as follows. Using a slit film having a width of ½ inches, a surface of the A layer is vertically pressed with a single blade to a depth of 0.5 mm while the film is run by 20 cm at a running tension of 500 g and a running rate of 6.7 cm/sec. The particle content in the shaved surface adhered to the blade edge is determined as above.

(3) Lamination Thickness

The cross-section of a film is observed by an ultrathin sectioning method (RuO$_4$ stain) using a transmission electron microscope (type H-600 made by Hitachi, Ltd.) at an acceleration voltage of 100 kV. A preferable magnification depends on the lamination thickness and generally ranges from 10,000 to 100,000.

Alternatively, the depth profile of the particle content is measured by secondary ion mass spectrometry, X-ray photoelectron spectrometry, IR spectrometry or confocal microscopy. After the maximum content in the depth profile is determined, a depth, from the surface, having a value, which is one-half the maximum, is defined as the lamination thickness.

(4) Number of Surface Projections

The surface roughness of the film in a scanning direction is measured using a double-detection scanning electron microscope (ESM-3200 made by Elionix Co., Ltd.) and a cross-section analyzer (PMS-1 made by Elionix Co., Ltd.), and the surface profile is regenerated on a screen of an image analyzer (IBAS2000 made by Carl Zeiss). The highest position of each projection from the flat portion of the film is defined as the height of the projection. The scanning is repeated 500 times at different positions, and projections having heights of 20 nm or more are counted. The magnification of the scanning electron microscope is in a range of 1,000 to 8,000. Alternatively, a high-precision optical interferometer-type three-dimensional surface analyzer (TOPO-3D made by WYKO) may be used to determine the heights of and the number of the projections. In this case, the effective magnification of the object lens is 40 to 200, and the use of a high-precision camera is useful. The number of the projections may be determined using an atomic force microscope or a scanning electron microscope at a magnification of 3,000 to 10,000 in which a film is tilted by 82.5° to obtain a topographical projection image. The number of the projections per 1 m$^2$ which is determined by an average of values in 100 visual fields may be used.

(5) Glass Transition Temperature (°C.) and Rigid Amorphous Content (%)

Using a slit film having a width of ½ inches, a surface of the A layer is vertically pressed with a single blade to a depth of 0.5 mm while the film is run by 20 cm at a running tension of 500 g and a running rate of 6.7 cm/sec. The shaved surface adhered to the blade edge is subjected to thermal analysis using a MDSC 2920 analyzer made by TA Instrument, with a mechanical cooling unit while supplying dry nitrogen gas at 30 ml/min to a measuring cell. The specific heat of the sample is determined at a sample weight of 5 mg, a temperature modulation cycle of 60 second and an amplification of the temperature modulation of 1 K, under an isothermal condition having an average heating rate of zero (measurement is continued for 20 minutes at a predetermined temperature to use the second 10-minute data as an observed value, and the same measurement is repeated after a temperature is increased by 2° C.) and the results are calibrated by 23-mg sapphire. The glass transition temperature is defined by a temperature corresponding to one-half the total change in specific heat from the glass state to the liquid state. The amorphous content is represented by the ratio of the total change in specific heat at the glass transition temperature divided by 77.8 J/(mol K) which is the specific capacity of completely amorphous PET. The crystallinity is determined as follows. A 5-mg biaxially oriented film is heated at a rate of 20 K/min without temperature modulation to determine the enthalpy of fusion of the crystal from the peak area. The crystallinity is calculated from the enthalpy of fusion divided by 26.9 kJ/mole for the perfect crystal (100%) of the PET. The rigid amorphous content (5) corresponds to the total (100)−(the amorphous content+the crystallinity).

(6) Output Characteristics (C/N ratio)

A cobalt-nickel (nickel content: 20 percent by weight) layer having a thickness of 200 nm is deposited on the film in accordance with the present invention using a continuous deposition system in the presence of a trace amount of oxygen. A carbon protective layer is formed thereon by a known process and is slit into strips with a width of 8 mm to prepare a pancake. A 200-m pancake is loaded in a cassette to form a cassette tape.

The C/N ratio of the tape at 7 MH±1 MHz is measured using a commercially available 8-mm VTR EV-BS3000 made by Sony Corporation.

The C/N ratio is compared with that of a commercially available Hi8-grade videotape (120-minute ME) and ranked as follows:

A: more than +3 dB

B: +1 dB to +3 dB

C: less than +1 dB

The rank A and rank B indicate that the tape can be satisfactorily used as a digital recording type VTR tape.

(7) Longitudinal Young's modulus

The longitudinal Young's modulus is determined using an Instron-type tensilometer at 25° C. and 65% RH according to ASTM-D-882.

(8) Size Stability

Using a sample having a length of 15 cm and a width of 1 cm in which one end is not fixed, the thermal shrinkage at 80° C. after 30 minutes and at 100° C. after 30 minutes are determined. When the thermal shrinkage is determined with a precision of 0.1% or less, the measurement is performed using a universal projector. The larger shrinkage between that in the longitudinal direction and that in the transverse direction is employed as the thermal shrinkage in the present invention.

The present invention will now be described by way of examples. It should be noted, however, that the invention defined in the appended claims is not restricted to the examples below.

EXAMPLE 1

PEN was prepared by ester-exchange and polycondensation of dimethyl 2,6-naphthalenedicarboxylate and ethylene glycol. Using an ethylene glycol slurry of 0.3-$\mu$m calcium carbonate particles, PEN containing 1 percent by weight of particles was polymerized by a conventional method.

After drying the PEN pellets at 180° C. for 8 hours under a reduced pressure of 3 Torr, a PEN polymer containing 0.3 percent by weight of 0.3-$\mu$m calcium carbonate particles (polymer A) and a PEN polymer containing 0.05 percent by weight of 0.3-$\mu$m calcium carbonate particles (polymer B) were supplied to a first extruder and a second extruder, respectively, were melted at 300° C., were filtered precisely, and were laminated through a rectangular converging block to form a double-layer (A/B) melt. Herein, the polymer A and the polymer B were prepared by dilution of the above PET containing 1 percent by weight of particles with a polymer not containing particles.

The melt was cooled and solidified on a casting drum at a surface temperature of 25° C. by an electrostatic casting process to form a non-stretched film, wherein the ratio of the gap of the die slit into strips with the thickness of the non-stretched film was 10. The discharged volumes of the first and second extruders were controlled to determine the total thickness and the thickness of the A layer.

The non-stretched film was stretched in four stages by differential rotation rates of two suites of rolls at a preheating temperature of 145° C. and a longitudinal draw ratio of 6.5. The stretching temperature and draw ratio of each stage was as follows:

| first stage: 145° C./1.2 | second stage: 135° C./1.8 |
|---|---|
| third stage: 130° C./1.5 | fourth stage: 125° C./2 |

The uniaxally-oriented film was stretched in the transverse direction using a tenter at 155° C. at a draw ratio of 4.8. The resulting film was annealed at 200° C. for 5 seconds under a longitudinal tension of 2 MPa, and was cooled stepwise to 180° C. by spending 3 seconds, to 160° C. by spending 5 seconds, to 120° C. by spending 5 seconds and to 60° C. by spending 5 seconds. A biaxially oriented film having a total thickness of 6.4 $\mu$m and an A-layer thickness of 0.5 $\mu$m was thereby prepared. The biaxially oriented film was allowed to stand at 110° C. and 60% RH for 24 hours. The characteristics of the biaxially oriented film are shown in Table 1. This film has excellent output characteristics.

EXAMPLE 2

PEN which was prepared as in EXAMPLE 1 and contained 0.2 percent by weight of cross-linked polystyrene particles having a diameter of 0.3 $\mu$m was used as the polymer A. PEN not containing particles was used as the polymer B. The polymer A and the polymer B were supplied to the first and second extruders, respectively, were melted at 300° C., were filtered precisely, and were laminated through a rectangular converging block to form a triple-layer (A/B/A) melt.

The melt was cooled and solidified on a casting drum at a surface temperature of 25° C. by an electrostatic casting process to form a non-stretched film, wherein the ratio of the gap of the die slit into strips with the thickness of the non-stretched film was 10. The discharged volumes of the first and second extruders were controlled to determine the total thickness and the thickness of the A layer.

The non-stretched film was stretched in four stages by differential rotation rates of two suites of rolls at a preheating temperature of 145° C. and a longitudinal draw ratio of 5.8. The uniaxially-oriented film was stretched in the transverse direction using a tenter at 155° C. at a draw ratio of 4.8. The resulting film was annealed at 220° C. for 5 seconds under a longitudinal tension of 1.5 MPa, and was cooled stepwise to 180° C. by spending 3 seconds, to 160° C. by spending 5 seconds, to 120° C. by spending 5 seconds, and to 60° C. by spending 5 seconds. A biaxially oriented film having a total thickness of 6.4 $\mu$m and an A-layer thickness of 0.2 $\mu$m was thereby prepared. The biaxially oriented film was allowed to stand at 110° C. and 60% RH for 24 hours. The characteristics of the biaxially oriented film are shown in Table 1. This film has excellent output characteristics.

EXAMPLE 3

PET was prepared by ester-exchange and polycondensation of dimethyl terephthalate and ethylene glycol. Using an ethylene glycol slurry of 0.5-$\mu$m calcium carbonate particles, PET containing 1 percent by weight of particles was polymerized by a conventional method.

After drying the PET pellets at 180° C. for 8 hours under a reduced pressure of 3 Torr, a PET polymer containing 0.5 percent by weight of 0.5-$\mu$m calcium carbonate particles (polymer A) and a PET polymer containing 0.1 percent by weight of 0.5-$\mu$m calcium carbonate particles (polymer B) were supplied to a first extruder and a second extruder, respectively, were melted at 280° C., were filtered precisely, and were laminated through a rectangular converging block to form a double-layer (A/B) melt. Herein, the polymer A and the polymer B were prepared by dilution of the above PET containing 1 percent by weight of particles with a polymer not containing particles.

The melt was cooled and solidified on a casting drum at a surface temperature of 25° C. by an electrostatic casting process to form a non-stretched film, wherein the ratio of the gap of the die slit into strips with the thickness of the non-stretched film was 10. The discharged volumes of the first and second extruders were controlled to determine the total thickness and the thickness of the A layer.

The non-stretched film was stretched in four stages by differential rotation rates of two suites of rolls at a preheating temperature of 85° C., a stretching temperature of 85 to 95° C., and a longitudinal draw ratio of 3.8. The stretching temperature and draw ratio of each stage was as follows:

| | |
|---|---|
| first stage: 85° C./1.5 | second stage: 90° C./1.3 |
| third stage: 92° C./1.3 | fourth stage: 95° C./1.5 |

The uniaxially-oriented film was stretched in the transverse direction using a tenter at 110° C. at a draw ratio of 3.8. The resulting film was annealed at 200° C. for 3 seconds under a longitudinal tension of 1.5 MPa, and was cooled stepwise to 160° C. by spending 3 seconds, to 150° C. by spending 5 seconds, to 120° C. by spending 5 seconds, and to 60° C. by spending 5 seconds. A biaxially oriented film having a total thickness of 6 μm and an A-layer thickness of 0.5 μm was thereby prepared. The biaxially oriented film was allowed to stand at 85° C. and 60% RH for 24 hours. The characteristics of the biaxially oriented film are shown in Table 1. This film has excellent output characteristics.

EXAMPLE 4

PET which was prepared as in EXAMPLE 3 and contained 0.5 percent by weight of cross-linked polystyrene particles having a diameter of 0.3 μm was used as the polymer A. PET not containing particles was used as the polymer B. The polymer A and the polymer B were supplied to the first and second extruders, respectively, were melted at 270° C. and 280° C., respectively, were filtered precisely, and were laminated through a rectangular converging block to form a triple-layer (A/B/A) film.

The non-stretched film was stretched in four stages by differential rotation rates of two suites of rolls at a preheating temperature of 85° C., a stretching temperature of 100 to 93° C., and a longitudinal draw ratio of 4.0. The stretching temperature and draw ratio of each stage was as follows:

| | |
|---|---|
| first stage: 100° C./1.1 | second stage: 98° C./1.2 |
| third stage: 95° C./2.5 | fourth stage: 93° C./1.2 |

The uniaxially-oriented film was stretched in the transverse direction using a tenter at 110° C. at a draw ratio of 3.8. The resulting film was annealed at 200° C. for 3 seconds under a longitudinal tension of 1 MPa, and was cooled stepwise to 160° C. by spending 3 seconds, to 150° C. by spending 5 seconds, to 120° C. by spending 5 seconds, and to 60° C. by spending 5 seconds. A biaxially oriented film having a total thickness of 6 μm and an A-layer thickness of 0.2 μm was thereby prepared. The biaxially oriented film was allowed to stand at 85° C. and 60% RH for 24 hours. The characteristics of the biaxially oriented film are shown in Table 1. This film has excellent output characteristics.

EXAMPLE 5

The polymer A was used as the A layer, PET not containing particles was used as the B layer, and PET containing 0.7 percent by weight of colloidal silica having a diameter of 0.03 μm was used as a polymer C. The polymers A, B and C were supplied to the first, second and third extruders, respectively, were melted at 270° C., 280° C. and 270° C., respectively, were filtered precisely, and were laminated through a rectangular converging block to form a triple-layer (A/B/C) film.

The non-stretched film was stretched in four stages by differential rotation rates of two suites of rolls at a preheating temperature of 85° C., a stretching temperature of 100° C., and a longitudinal draw ratio of 3.8. The uniaxially-oriented film was stretched in the transverse direction using a tenter at 110° C. at a draw ratio of 3.8. The resulting film was annealed at 200° C. for 3 seconds under a longitudinal tension of 1 MPa, and was cooled stepwise to 160° C. by spending 3 seconds, to 100° C. by spending 5 seconds, and to 60° C. by spending 10 seconds. A biaxially oriented film having a total thickness of 6 μm, an A-layer thickness of 0.5 μm, and a C layer thickness of 0.05 μm was thereby prepared. The biaxially oriented film was allowed to stand at 85° C. and 60% RH for 24 hours. The characteristics of the biaxially oriented film are shown in Table 1. This film has excellent output characteristics.

EXAMPLE 6

Using an ethylene glycol slurry of 0.3-μm aluminum silicate particles, PET containing 1 percent by weight of particles was polymerized by a conventional method.

After drying the PET pellets at 180° C. for 8 hours under a reduced pressure of 3 Torr, a PET polymer containing 0.3 percent by weight of 0.3-μm aluminum silicate particles (polymer A) and a PET polymer containing 0.1 percent by weight of 0.3-μm aluminum silicate particles (polymer B) were supplied to a first extruder and a second extruder, respectively, were melted at 270° C. and 280° C., respectively, were filtered precisely, and were laminated through a rectangular converging block to form a double-layer (A/B) melt. Herein, the polymer A and the polymer B were prepared by dilution of the above PET containing 1 percent by weight of particles with a polymer not containing particles.

The melt was cooled and solidified on a casting drum at a surface temperature of 25° C. by an electrostatic casting process to form a non-stretched film, wherein the ratio of the gap of the die slit into strips with the thickness of the non-stretched film was 10. The discharged volumes of the first and second extruders were controlled to determine the total thickness and the thickness of the A layer.

The non-stretched film was stretched in four stages by differential rotation rates of two suites of rolls at a preheating temperature of 85° C., a stretching temperature of 102° C., and a longitudinal draw ratio of 3.6. The uniaxially-oriented film was stretched in the transverse direction using a tenter at 105° C. at a draw ratio of 3.5. Furthermore, the film was stretched in the longitudinal direction by differential rotation rates of rolls at 115° C. at a draw ratio of 1.65. The resulting film was annealed at 200° C. for 3 seconds under a longitudinal tension of 2 MPa, and was cooled stepwise to 160° C. by spending 3 seconds, to 100° C. by spending 5 seconds, and to 60° C. by spending 10 seconds. A biaxially oriented film having a total thickness of 6 μm and an A-layer thickness of 0.5 μm was thereby prepared. The biaxially oriented film was allowed to stand at 85° C. and 60% RH for 24 hours. The characteristics of the biaxially oriented film are shown in Table 1. This film has excellent output characteristics.

EXAMPLE 7

The polymer A used in EXAMPLE 4 was used as the A layer and the polymer A used in EXAMPLE 1 was used as the B layer. The polymers A and B were supplied to the first and second extruders, respectively, were melted at 285° C. and 295° C., respectively, were filtered precisely, and were laminated through a rectangular converging block to form a double-layer (A/B) melt.

The melt was cooled and solidified on a casting drum at a surface temperature of 25° C. by an electrostatic casting process to form a non-stretched film, wherein the ratio of the gap of the die slit into strips with the thickness of the non-stretched film was 10. The discharged volumes of the first and second extruders were controlled to determine the total thickness and the thickness of the A layer.

The non-stretched film was stretched in four stages by differential rotation rates of two suites of rolls at a preheating temperature of 135° C. and a longitudinal draw ratio of 4.2. The uniaxially-oriented film was stretched in the transverse direction using a tenter at 150° C. at a draw ratio of 4.2. The resulting film was annealed at 220° C. for 5 seconds under a longitudinal tension of 1.5 MPa, and was cooled stepwise to 180° C. by spending 3 seconds, to 160° C. by spending 5 seconds, to 120° C. by spending 10 seconds, and to 60° C. by spending 5 seconds. A biaxially oriented film having a total thickness of 6 μm and an A-layer thickness of 0.5 μm was thereby prepared. The biaxially oriented film was allowed to stand at 110° C. and 60% RH for 24 hours. The characteristics of the biaxially oriented film are shown in Table 1. This film has excellent output characteristics.

Comparative Example 1

A uniaxially-oriented film having a thickness and a particle content shown in Table 2 was prepared at a preheating temperature of 135° C. and a longitudinal draw ratio of 4.2 by differential rotation rates of two suites of rolls. The uniaxially-oriented film was stretched in the transverse direction using a tenter at 150° C. at a draw ratio of 4.2. The resulting film was annealed at 180° C. for 1 second at a fixed length to form a biaxially-oriented polyester film. As shown in Tables 1 and 2, this film does not have excellent output characteristics.

Comparative Example 2

A uniaxially-oriented film having a thickness and a particle content shown in Table 2 was prepared at a preheating temperature of 145° C. and a longitudinal draw ratio of 5.8 by differential rotation rates of two suites of rolls. The uniaxially-oriented film was stretched in the transverse direction using a tenter at 155° C. at a draw ratio of 4.8. The resulting film was annealed at 180° C. for 1 second at a fixed length to form a biaxially-oriented polyester film. As shown in Tables 1 and 2, this film does not have excellent output characteristics.

Comparative Example 3

A single-layered biaxially-oriented film containing 0.04 percent by weight of 0.3-μm calcium carbonate was prepared as in EXAMPLE 3. As shown in Tables 1 and 2, this film does not have excellent output characteristics.

Comparative Example 4

A single-layered biaxially-oriented film containing 0.1 percent by weight of 0.3-μm cross-linked polystyrene particles was prepared as in EXAMPLE 2. As shown in Tables 1 and 2, this film does not have excellent output characteristics.

Comparative Example 5

PET which was prepared as in EXAMPLE 3 and contained 0.2 percent by weight of cross-linked polystyrene particles having a diameter of 0.3 μm was used as the polymer A. PET not containing particles was used as the polymer B. The polymer A and the polymer B were supplied to the first and second extruders, respectively, were melted at 270° C. and 280° C., respectively, were filtered precisely, and were laminated through a rectangular converging block to form a triple-layer (A/B/A) film.

The non-stretched film was stretched by differential rotation rates of two suites of rolls at a preheating temperature of 85° C., a stretching temperature of 90° C., and a longitudinal draw ratio of 3.8. The uniaxially-oriented film was stretched in the transverse direction using a tenter at 110° C. at a draw ratio of 3.3. Furthermore, the film was stretched in the longitudinal direction at 125° C. at a draw ratio of 1.2 and then in the transverse direction at 128° C. at a draw ratio of 1.15. The resulting film was annealed at 230° C. for 30 seconds at a fixed length. A biaxially oriented film having a total thickness of 6 μm and an A-layer thickness of 0.5 1μm was thereby prepared. As shown in Tables 1 and 2, this film does not have excellent output characteristics.

TABLE 1

| EXAMPLE | Layer Structure | Polymer (Thickness) | A Layer | | | | Longitudinal Young's modulus (GPa) | Thermal Shrinkage (%) | | Output Characteristics |
| | | | Particle Diameter Content | Number of Projections (thousand/mm$^2$) | Glass Transition Temperature | Rigid Amorphous Content | | $Y_1$ 80° C. 30 min. | $Y_2$ 100° C. 30 min. | |
| --- | --- | --- | --- | --- | --- | --- | --- | --- | --- | --- |
| 1 | A/B | PEN (0.5 μm) | Calcium Carbonate 0.3 μm 0.2 wt % | 70 | 144° C. | 46% | 9.5 | — | 0.4 | A |
| 2 | A/B/A | PEN (0.2 μm) | Cross-linked Poly-styrene 0.3 μm 0.2 wt % | 3.5 | 137° C. | 44% | 8.1 | — | 0.4 | A |
| 3 | A/B | PET (0.5 μm) | Calcium Carbonate 0.5 μm 0.5 wt % | 2.5 | 95° C. | 28% | 5.8 | 0.3 | — | B |
| 4 | A/B/A | PET (0.2 μm) | Cross-linked Poly-styrene | 8.6 | 90° C. | 23% | 5.2 | 0.5 | — | B |

TABLE 1-continued

| EXAMPLE | Layer Structure | Polymer (Thickness) | Particle Diameter Content | A Layer Number of Projections (thousand/mm²) | Glass Transition Temperature | Rigid Amorphous Content | Young's modulus (GPa) | Longitudinal Thermal Shrinkage (%) Y₁ 80° C. 30 min. | Y₂ 100° C. 30 min. | Output Characteristics |
|---|---|---|---|---|---|---|---|---|---|---|
| 5 | A/B/C | PET (0.5 μm) | 0.3 μm 0.5 wt % Calcium Carbonate | 4.5 | 93° C. | 25% | 5.5 | 0.4 | — | B |
| 6 | A/B | PET (0.5 μm) | 0.3 μm 0.2 wt % Aluminum Silicate | 6.5 | 105° C. | 39% | 7.5 | 0.3 | — | A |
| 7 | A/B | PET (0.5 μm) | 0.3 μm 0.3 wt % Cross-linked Poly-styrene 0.3 μm 0.2 wt % | 8.5 | 108° C. | 36% | 6.6 | 0.3 | — | A |

TABLE 2

| COMPARATIVE EXAMPLE | Layer Structure | Polymer (Thickness) | Particle Diameter Content | A Layer Number of Projections (thousand/mm²) | Glass Transition Temperature | Rigid Amorphous Content | Young's modulus (GPa) | Longitudinal Thermal Shrinkage (%) Y₁ 80° C. 30 min. | Y₂ 100° C. 30 min. | Output Characteristics |
|---|---|---|---|---|---|---|---|---|---|---|
| 1 | A/B | PET (0.1 μm) | Cross-linked Poly-styrene 0.3 μm 10 wt % | 8 | 115° C. | 8% | 5.4 | 0.6 | — | C |
| 2 | A/B | PEN (0.5 μm) | Calcium Carbonate 0.3 μm 2.0 wt % | 4.5 | 140° C. | 5% | 7.6 | — | 0.6 | C |
| 3 | Single Layer | PET (6 μm) | Calcium Carbonate 0.5 μm 0.04 wt % | 0.3 | 110° C. | 36% | 5.8 | 0.5 | — | C |
| 4 | Single Layer | PEN (6 μm) | Cross-linked Poly-styrene 0.3 μm 0.1 wt % | 2.3 | 139° C. | 48% | 8.0 | — | 0.6 | C |
| 5 | A/B/A | PET (0.5 μm) | Cross-linked Poly-styrene 0.3 μm 0.2 wt % | 8.9 | 90° C. | 57% | 4.3 | 0.7 | — | C |

What is claimed is:

1. A biaxially-oriented polyester film comprising at least two layers, at least one layer being an outermost layer and comprising a polyester having a rigid amorphous content of about 10 to about 55%, said film having an inner layer, said biaxially-oriented polyester film having a longitudinal Young's modulus of at least about 4.5 GPa.

2. The film defined in claim 1, wherein said rigid amorphous content of said outermost layer is about 15 to about 45%.

3. The film defined in claim 1, wherein said Young's Modulus is about 5 to about 10 GPa.

4. A biaxially-oriented polyester film according to claim 1, wherein said at least one outermost layer comprises polyethylene terephthalate and has a glass transition temperature of about 95 to about 125° C. and a rigid amorphous content of about 10 to about 45%.

5. The film defined in claim 4, wherein said outermost layer has a glass transition temperature of about 100 to about 120° C.

6. A biaxially-oriented polyester film according to claim 4, wherein the values of the longitudinal Young's modulus X (GPa) and the longitudinal thermal shrinkage $Y_1$ (%) at 80° C. after 30 minutes satisfy the relationship $Y_2 \leq 0.05X$.

7. A biaxially-oriented polyester film according to claim 1, wherein said outermost layer comprises polyethylene 2,6-naphthalenedicarboxylate and has a glass transition temperature of about 125 to about 155° C.

8. The film defined in claim 7, wherein said outermost layer has a glass transition temperature of about 125 to about 150° C.

9. A biaxially-oriented polyester film according to claim 7, wherein the values of the longitudinal Young's modulus X (GPa) and the longitudinal thermal shrinkage $Y_2$ (%) at 100° C. after 30 minutes satisfy the relationship $Y_2 \leq 0.05X$.

10. A biaxially-oriented polyester film according to claim 1, wherein said outermost layer contains about 0.05 to about 3.0 percent by weight of inert inorganic or organic particles, and wherein the number of surface projections of said outermost layer is in a range of about 3,000 to about 15,000,000/mm².

11. The film defined in claim 10 wherein said number of projections is about 5,000/mm² to about 12,000,000/mm².

12. The film defined in claim 10, wherein the percentage of particles is about 0.1 to about 2% by weight.

13. The film defined in claim 10, wherein the average size of said particles is about 0.01 to about 1.5 μm.

14. The film defined in claim 13, wherein the relative standard deviation of said particles size is about 0.5 or less.

15. The film defined in claim 13, wherein the relative standard deviation of said particles size is about 0.3 or less.

16. The film defined in claim 13, wherein the relative standard deviation of said particle size is about 0.2 or less.

17. The film defined in claim 13 wherein the particle content of an inner layer of said film is about 0.05 to about 3.0% by weight.

18. The film defined in claim 13 wherein the particle content of an inner layer of said film is about 0.02 to about 2.0% by weight.

19. The film defined in claim 13 wherein the particle content of an inner layer of said film is about 0.05 to about 1.0% by weight.

20. The film defined in claim 13, wherein an inner layer of said film contains particles having an average size of about 0.05 to 1.0 μm.

21. The film defined in claim 13, wherein an inner layer of said film contains particles having an average size of about 0.1 to 0.8 μm.

22. The film defined in claim 10, wherein the average size of said particles is about 0.02 to about 1.0 μm.

23. The film defined in claim 10, wherein the relationship between the thickness t of the outermost layer and the average particle diameter d of the particles in said outermost layer is:

$$0.2d \leq t \leq 10d.$$

24. The film defined in claim 10, wherein the relationship between the thickness t of the outermost layer and the average particle diameter d of the particles in said outermost layer is:

$$0.3d \leq t \leq 5d.$$

25. The film defined in claim 10, wherein the relationship between the thickness t of the outermost layer and the average particle diameter d of the particles in said outermost layer is:

$$0.5d \leq t \leq 3d.$$

26. The film defined in claim 1, wherein the thickness of said outermost layer of said film is about 0.01 to about 3.0 μm.

27. The film defined in claim 1, wherein the thickness of said outermost layer of said film is about 0.02 to about 2.0 μm.

28. The film defined in claim 1, wherein the thickness of said outermost layer of said film is about 0.03 to about 1.0 μm.

29. A process for producing the biaxially oriented polyester film of claim 1 which comprises a step of consecutive biaxial stretching an unoriented polyester film at a draw ratio of about 3 to about 8 in the longitudinal direction by three stages at about 70 to about 160° C., a step of stretching the longitudinally stretched film at a draw ratio of about 3 to about 8 in the transverse direction at about 80 to about 150° C., a step of heat-treating the biaxially stretched film, and a step of cooling the heat-treated film to ordinary temperature by three or more stages at about 180 to about 50° C.

30. The process defined in claim 29, wherein said stretching in the longitudinal direction includes first stage of stretching at a draw ratio of about 1 to about 3 at about 70 to about 100° C., second stage of stretching at a draw ratio of about 1 to about 3 at a higher temperature than the stretching temperature of the first stage, and third stage of stretching at a draw ratio of about 1 to about 3 at a higher temperature than the stretching temperature of the second stage.

31. The process defined in claim 29, wherein said stretching in the longitudinal direction includes first stage of stretching at a draw ratio of about 1 to about 2 at about 110 to about 160° C., second stage of stretching at a draw ratio of about 1 to about 3 at a lower temperature than the stretching temperature of the first stage, and third stage of stretching at a draw ratio of about 1 to about 3 at a lower temperature than the stretching temperature of the second stage.

32. The process defined in claim 29, wherein said heat-treating is conducted at a temperature of about 60° C. or more but less than the glass transition temperature of said polyester at a humidity of about 80% RH or less for about 24 to 240 hours.

33. The process defined in claim 29, wherein said cooling is conducted applying to said heat-treated film a tension of 1 MPa or more in the longitudinal direction.

34. The process defined in claim 29 which further comprises a step of stretching in the longitudinal direction after the step of stretching in the transverse direction.

35. A process for producing the biaxially oriented polyester film of claim 1 which comprises the steps of:

simultaneous biaxial stretching of an unoriented polyester film, heat-treating the biaxially stretched film, and cooling the heat-treated film to ordinary temperature by three or more stages at about 180 to about 50° C.

36. The process according to claim 35, wherein said heat-treating is conducted at a temperature of about 60° C. or more but less than the glass transition temperature of said polyester at a humidity of about 80% RH or less for about 24 to about 240 hours.

* * * * *